March 29, 1932. A. HOLMSTROM 1,851,513
AIRCRAFT AND WATERCRAFT CONSTRUCTION
Filed July 11, 1929 6 Sheets-Sheet 1
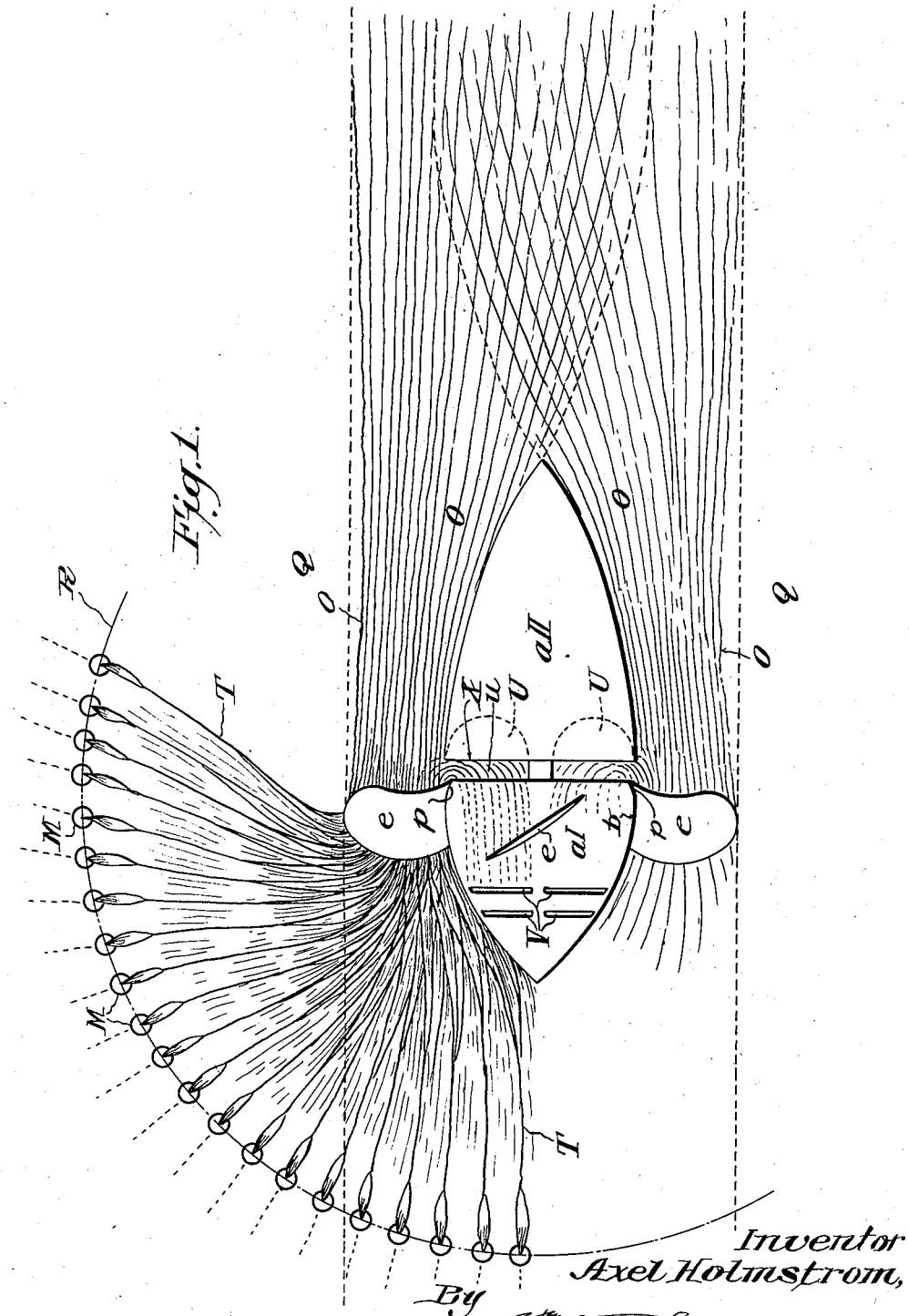

March 29, 1932. A. HOLMSTROM 1,851,513
AIRCRAFT AND WATERCRAFT CONSTRUCTION
Filed July 11, 1929 6 Sheets-Sheet 2
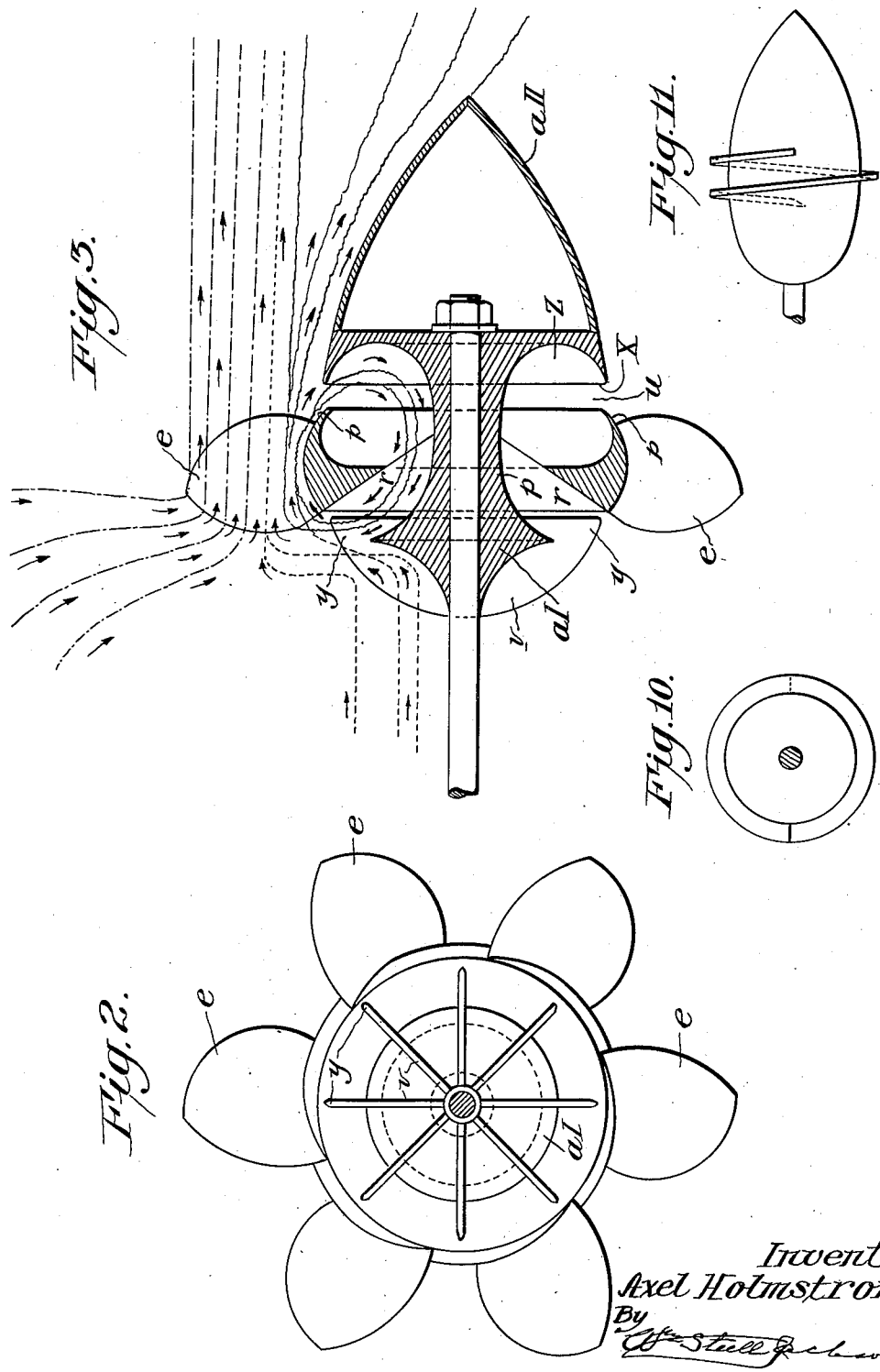
Inventor
Axel Holmstrom,
By
Attorney.

March 29, 1932.  A. HOLMSTROM  1,851,513
AIRCRAFT AND WATERCRAFT CONSTRUCTION
Filed July 11, 1929  6 Sheets-Sheet 3
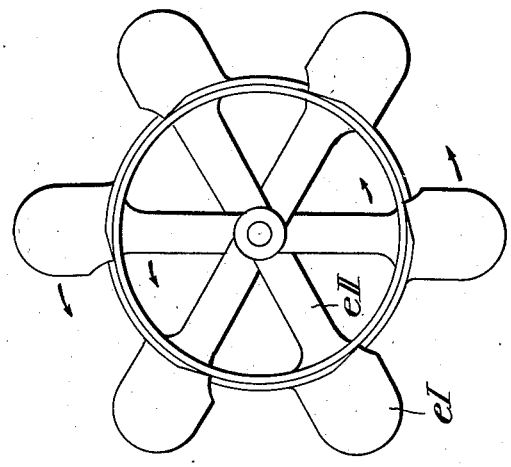
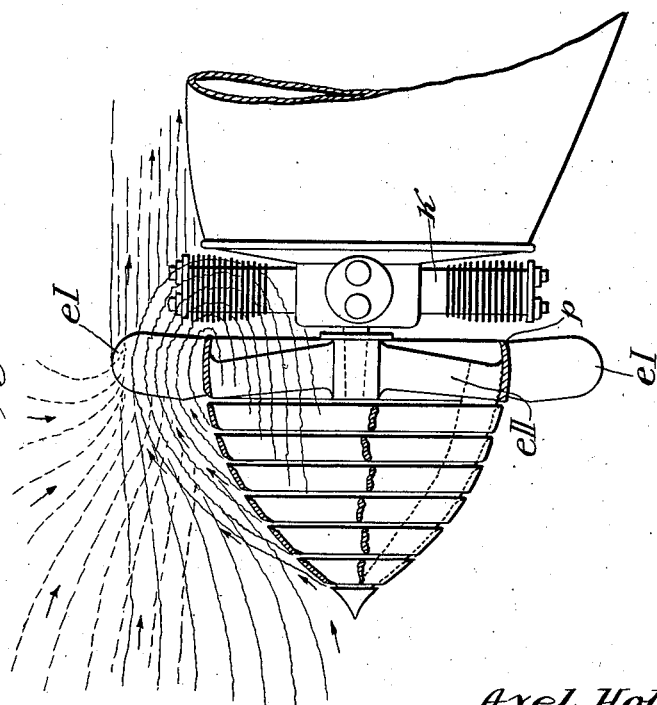
Inventor
Axel Holmstrom,
By
Attorney.

March 29, 1932. A. HOLMSTROM 1,851,513
AIRCRAFT AND WATERCRAFT CONSTRUCTION
Filed July 11, 1929 6 Sheets-Sheet 4
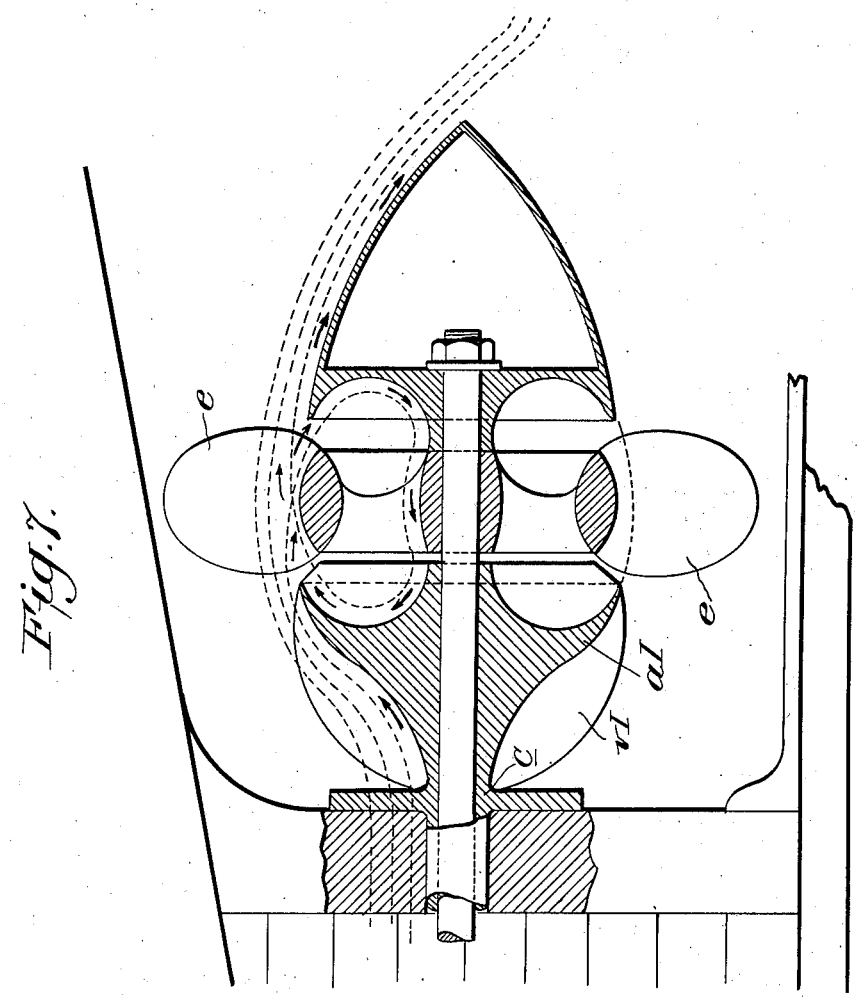
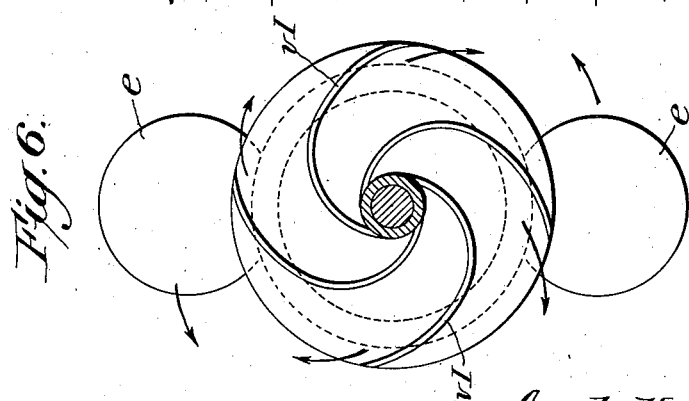
Inventor
Axel Holmstrom,
By
Attorney.

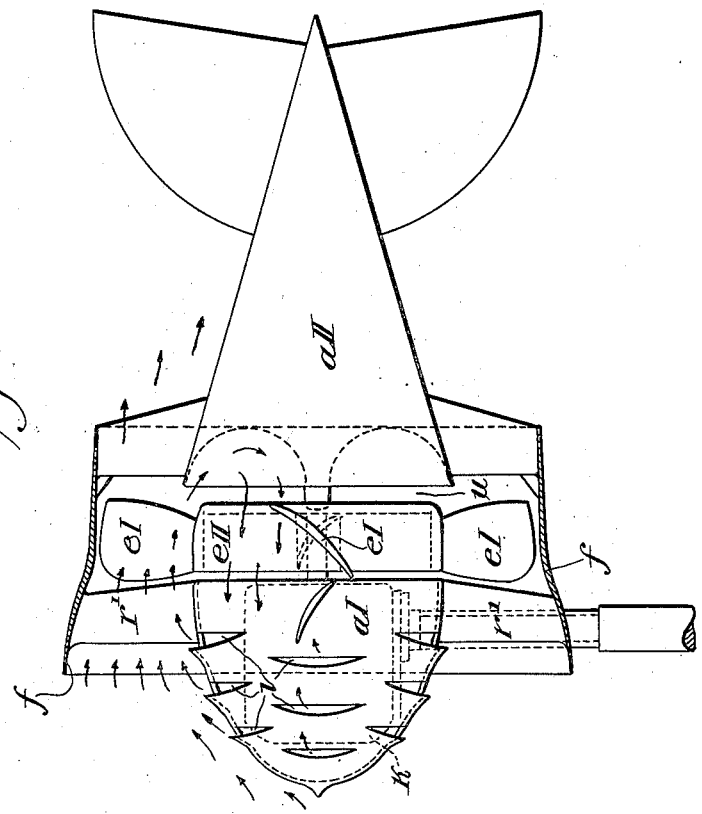
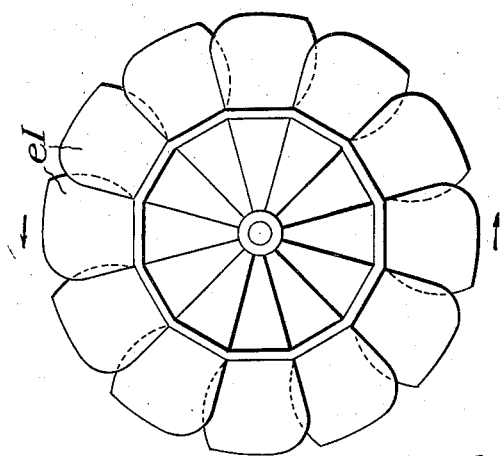

March 29, 1932.   A. HOLMSTROM   1,851,513
AIRCRAFT AND WATERCRAFT CONSTRUCTION
Filed July 11, 1929    6 Sheets-Sheet 6
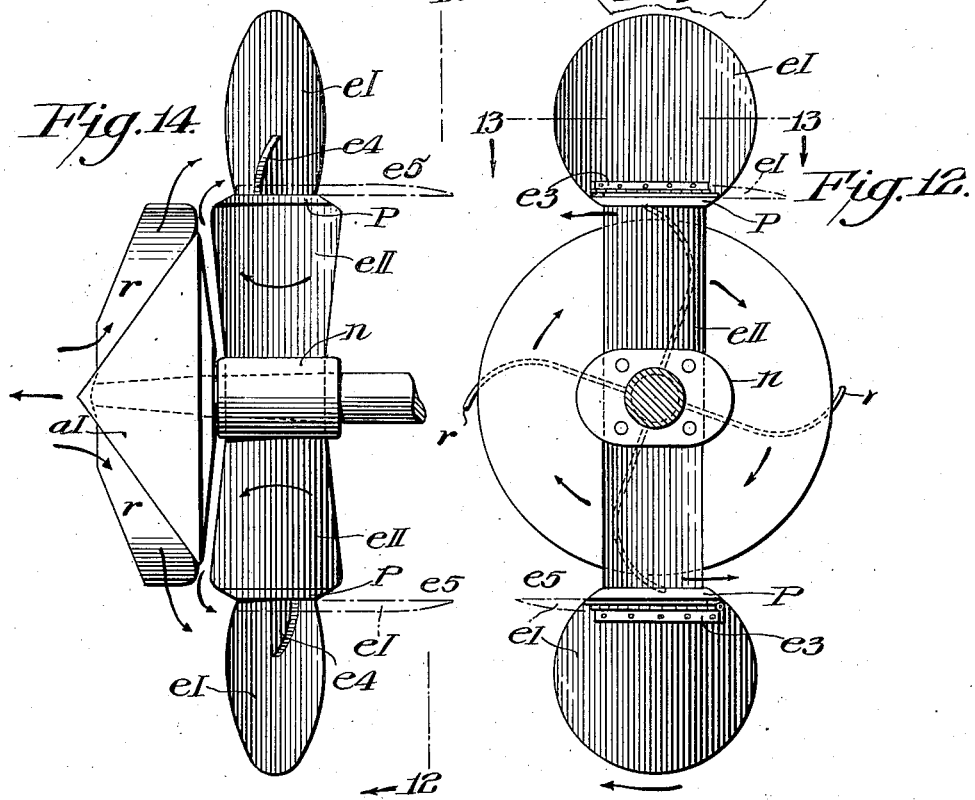
Inventor
Axel Holmstrom,
By
Attorney.

Patented Mar. 29, 1932

1,851,513

UNITED STATES PATENT OFFICE

AXEL HOLMSTROM, OF MONTE CARLO, MONACO

AIRCRAFT AND WATERCRAFT CONSTRUCTION

Application filed July 11, 1929, Serial No. 377,416, and in Germany May 17, 1929.

My invention relates to a propeller for operation in a fluid medium that may be air, water or gas, the propeller being thought to have its widest application upon aircraft and watercraft, and the invention being in part a development of the subject matter of my earlier application Ser. No. 353,407 entitled "Propeller or turbine for water, air and gases", filed April 8, 1929.

A purpose of my invention is to provide a novel propeller structure that will be easy and inexpensive to manufacture and which will well meet the needs of service.

A further purpose is to provide a propeller that will deliver a suitable quantity of the fluid upon which it is operating to the front of the propeller blade, lessening suction immediately in front of the propeller by returning forward a portion of the fluid medium that is being thrown rearward by the propeller.

A further purpose is to mount a propeller blade upon the outside circumference of a hollow shell delivering a portion of the propeller discharge into the interior of the shell and thence forwardly to the receiving side of the propeller.

A further purpose is to provide a propeller member with outer vanes that direct the fluid medium rearwardly and inner vanes that return forwardly a small portion of the medium that has already been acted upon by the outer blades.

A further purpose is to mount propeller blades upon a two-part hollow body, providing an opening between the parts through which opening part of the discharging medium can enter inside the body to be released later through openings toward the front of the body.

A further purpose is to mount a dynamo upon a propeller shaft adjacent a propeller.

A further purpose is to hinge propeller blades around the outside circumference of a streamline body.

Further purposes will appear in the specification and in the claims.

I have elected to show a few only of the different forms of my invention, illustrating these to considerable extent diagrammatically and selecting forms that are practical and efficient in operation and which well illustrate the principles involved.

Figure 1 is a view illustrating the results of an experiment made with the new propeller, the view being a side elevation of structure embodying one form of my invention and showing streamlines as found by experiment in the medium acted upon by the propeller.

Figures 2 and 3 are respectively front elevation and sectional side elevation of propeller structure embodying a form of my invention that is well adapted to use in water.

Figure 4 is a fragmentary partially sectional longitudinal view showing somewhat different form of propeller for use with aircraft.

Figure 5 is a front elevation of the propeller shown in Figure 4.

Figures 6 and 7 are sections respectively upon the lines 6—6 and 7—7 of Figures 7 and 6 and show mounted upon a boat another form of propeller structure that embodies my invention.

Figures 8 and 9 are front and side elevations respectively of another embodiment of my invention for use as a wind motor, Figure 8 showing propellers only.

Figures 10 and 11 are front and side elevations respectively of another form illustrating a minor modification from that of Figures 2 and 3.

Figures 12, 13 and 14 are respectively rear end elevation, top plan and side elevation of a streamline body propeller for aircraft.

Describing in illustration and not in limitation and referring to the drawings:—

An experiment made by the inventor and shown in Figure 1 gives a clear conception of how a propeller or turbine having a streamline body functions.

The smoke-candles M were arranged along the circle line R in front of the propeller and the lines of smoke T from the candles were in approximate accord with the figure and show clearly the reaction of the medium in which the propeller or turbine is rotating.

The experiment shows how the medium is drawn to the propeller blades passing in between them under high pressure and thrown backwards with very high speed in the form of a compressed medium column.

This type of propeller or turbine is altogether different from propellers or turbines now in use and has the following advantages:—

A propeller or turbine with a streamline body gives a minimum of resistance to motion forward.

The front part $aI$ opens the way through the medium and the rearwardly tapering rear part $aII$ is pressed forward when the compressed medium column O back of the propeller blades expands towards the propeller center.

This minimum resistance is possible only with the type of propeller or turbine to which this invention refers, in which the propeller or turbine is provided with a streamline body of unusually large diameter, a diameter over one third of the total outside propeller diameter.

The medium mass is drawn inward to the propeller with great force, at the same time being pressed by the tapering front part $aI$ of the body to the propeller blades $e$, thus giving these blades a highly compressed medium in which to work. The propeller or turbine blades will cut into this compressed medium, similarly to a bolt in a nut.

The propeller or turbine blades $e$ draw (through a great vacuum) the medium to the propeller from a spherical space in front of and sideward of the blades represented in Figure 1 by the sphere R and the conical bottom of the rearmost smoke lines T, back of which an inactively rolling medium Q around the compressed medium column forms itself and follows the forward motion.

The larger the circumference of the streamline body at $b$, the greater and more forceful is naturally the medium mass, which is drawn to and compressed by the propeller blades $e$. The compression of the medium column O back of the blades and the pressure on the rear part $aII$ of the body through the expansion of the column is also higher, this pressure driving the streamline body forward like a piston.

The experiments by the inventor showed an actual decrease of the diameter of the compressed medium column O back of the propeller blades (as illustrated in Figure 1) which is of the greatest advantage for the expansion pressure towards the center.

Figure 1 also shows an opening $u$ between the front part $aI$ and the rear part $aII$ of the streamline body, through which opening a part of the medium mass is diverted to the inside of the streamline body.

The sharp edge X and the concave streamline-formed hollows U of $aII$ direct part of the medium inward and forward to the hollow front part $aI$, from where this medium is thrown out through the optionally arranged openings V thus causing a great additional concentration of the medium in which the blades rotate.

The additional medium can also be diverted to the interior of the body through inward tapering P of the rear edge of $aI$ and also through the arrangement of propeller blades inside $aI$ having reversed driving direction or pitch to the outside propeller blades, thus drawing medium from the outside to the front part of $aI$ and pressing it out through the openings V.

Other optional ventilation blades inside $aI$ can be used to drive this additional medium forward as well by forward as rearward motion of the craft driven by the propeller.

That this new arrangement of feeding the propeller or turbine blades with additional medium from the inside of the propeller or turbine body is impossible with the present day propeller or turbine is evident.

The hubs to which the blades were fastened, were always too small for such an arrangement and furthermore they never were of a hollow construction. Therefore the hollow propeller streamline bodies or hollow propeller hubs of any size as in the turbine streamline body propellers described below and illustrated in the Figures 2 to 9 are something absolutely new.

Figures 2 and 3 show a streamline body propeller for water, consisting of three parts:—the front part $aI$, the propeller ring $p$ with the inside ventilator blades $r$ and outside propeller blades $e$, and finally the rear part $aII$ with its cutting edge X and streamline formed concave hollows Z to lead part of the medium inwardly and forwardly.

The radial blades $v$ on the front part $aI$ serve the purpose of drawing the medium to $aI$ and then throwing it out at the ends $y$ of the blades, whereby it is mixed with the medium coming from the interior of the streamline body that is being driven forward by the blades $r$ and the combined flows are driven out to the propeller blades $e$.

The rear edge of the propeller ring is curved inwardly in order to facilitate the entry of a part of the medium into the opening $u$ between the propeller ring $p$ and the rear part $aII$.

Figures 4 and 5 show an aircraft streamline propeller consisting of the front part and the inner and outer turbine propellers $eII$ and $eI$ which pitch and therefore drive in opposite directions. The inner turbine blades $eII$ are constructed as spokes of the whole "duplex turbine propeller".

Something absolutely new is the arrangement of fastening the outside blades $eI$ to the inside turbine with hinges, so that when the aircraft is gliding with the engine at rest they can automatically fall behind the nearest edge of the front part, thus eliminating the great friction and resistance of the usual stiff propellers during gliding.

As soon as the engine is started the centrifugal force brings the blades back to their active driving position.

This arrangement can be used also for propellers in water. When falling down, naturally the blades must not touch the engine or other parts.

The front part is a streamline combination of several segment rings, arranged one after another on the propeller, which rings because of their special profiles draw the air or other fluid medium to the front part and then force the medium out through the openings as additional medium for the outside propeller blades.

This will also cause good cooling of the engine and associated mechanism.

The rear part of the streamline body is in this case the aircraft body itself which can taper rearwards conically or wedge-like.

Figures 6 and 7 show again a boat propeller in three parts, so constructed that here the front part $aI$ serves as a shaft bearing $C$ and therefore is not rotating.

The front part $aI$ carries the curved ventilator blades $vI$, so arranged as to collect the medium, water, air or the like by forward motion of the vessel and deliver it without losses in compressed form (or, in the case of water, at high velocity) to the propeller blades $e$.

The ventilator blades $vI$ are curved in a direction opposite to the rotating direction of the propeller or turbine blades $e$ and therefore the medium coming from $vI$ will meet the blades $e$ tangentially.

Figures 8 and 9 show a streamline wind motor or turbine which is directly connected to the shaft of a dynamo for the purpose of generating electric current and this wind motor or turbine can be placed directly on a mast, antenna or on an airplane or airship or on other crafts in each case so arranged as to be movable to continually face the wind.

The compression funnel $f$ serves the purpose of giving the medium (air, water or gas) entering between the funnel $f$ and the front part $aI$, compression and higher speed before reaching the propeller or turbine blades $eI$.

The funnel-spokes $r'$, placed within the funnel in front of the blades $eI$ are curved and given a pitch to make the passing medium column rotate in the desired direction.

Through this arrangement these wind motors are given a maximum of speed and energy, especially as additional medium is taken through the opening $u$ between the propeller turbine $eI$, $eII$ and the tapering conical or wedge-shaped rear part $aII$ and with great force driven forward to $aI$ by the inside turbine blades $eII$ to escape through the rearwardly directed openings $v$ and finally reach the blades $eI$.

Another advantage of the medium current passing through $aI$ is the resultant excellent cooling of the dynamo $k$.

Instead of driving a dynamo, the wind motor can be used to drive an air, gas or water pump or the like, which in case of need may be placed inside the rear part $aII$.

In Figures 10 and 11 I show a form of propeller in which the propeller blade winds around the full circumference of the body.

Obviously the arcuate extent of the individual propeller blades is a matter of design, being variant according to the speed at which the propeller is driven and also with the density of the fluid medium in which the propeller is operated.

The propeller having a great arcuate extent, for example one that winds around the full circumference of the body will normally have a low pitch and as a result would be best adapted to very high speeds and mediums of high density.

Figures 12, 13 and 14 show a streamline propeller of simple construction that is especially suitable for aircraft or the like because of its great simplicity and sturdiness.

The propeller consists of the front part $aI$ and the propeller blades $eI$ and $eII$.

The two inside blades $eII$ are fastened to the central hub $n$ and the two outside blades are fastened to the carrying plates $P$ located at the ends of the inside blades.

The inside and outside blades have opposite driving direction or pitch and the outside blades $eI$ can be fastened to the plates $P$ by means of a suitable hinge, so as to fall back into a neutral position when the craft glides with the engine off.

The front part $aI$ is in this case a conical wind shield, carrying on its front surface two or more ventilator blades $r$.

These ventilator blades can be curved, as in Figure 6, in which case during gliding flight the wind pressure will keep the whole propeller and the engine in a slow rotation, thus making it possible to start the engine at will even with the outside propeller blades in neutral position.

The front part $aI$ can also be left out without a loss of the "overfeeding" of the outside propeller blades with medium, because the inside blades will continue their function just the same. The body back of the propeller blades should be streamline shaped as for instance an airplane body.

It will be understood that while the propeller is operating the force exerted upon the propeller is in a direction to urge the craft forward; therefore upon the rearward side of the propeller and that as soon as the craft glides with the engine off, the reverse is true, the pressure of the air coming upon the forward side of the propeller.

I provide a propeller that is adapted to feather when the engine is off, that is to close when the pressure is exerted upon the forward side to lie in line with the wind, and to open by centrifugal action when the engine speeds up the propeller, a suitable stop e4 being provided to prevent the propeller from opening forwardly beyond the proper point.

The figures are to considerable extent diagrammatic and the illustrated type of hinge connection e3 between the driving portion of the propeller and the inner portion thereof is intended as a conventional showing for any hinge adapted to function in the intended way.

The closed or feathered positions of the outer blades are shown in dot-and-dash lines at e5.

The four ventilator vanes shown in Figure 12 on the wind shield have been omitted in Figure 13 while Figure 14 shows two and omits two of these vanes.

In order to secure full advantage of my application already filed in Germany the description in this application has been conformed closely to that of the German case.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:

1. In a propeller of the character indicated, a body, one or more propeller blades around the outside circumference thereof and deflecting surfaces directing a portion of the discharge from the propeller from the discharge side of the propeller to a point on the intake side of the propeller.

2. In a propeller of the character indicated, a streamline body, one or more propeller blades around the outside circumference thereof and deflecting surfaces directing a portion of the discharge from the propeller into the interior of the body for redelivery on the intake side of the propeller.

3. In a propeller of the character indicated, outer blades adapted to direct the fluid medium rearwardly and inner blades adapted to direct a portion of the discharge from the outer blades forwardly and delivering it on the intake side.

4. In a propeller of the character indicated, a hollow streamline body, propeller blades ranged around the outside of the body directed rearwardly, the said body having one or more openings into its interior at the discharge side of the propeller and other openings in front of the propeller for discharging the medium that enters the rearward opening to the forward side of the blades.

5. A hollow forwardly directed streamline body, rearwardly directed blades mounted around the outside circumference thereof, forwardly directed blades inside the body and a rotor element of a dynamo rigidly fastened to the propeller, a portion of the discharge from the outer blades being directed inwardly to cool the rotor element and to be subsequently returned through the outside shell of the body upon the discharge side of the outer blades.

6. In a propeller or turbine for water, a hollow streamline body having forward and rearward openings into its interior and an outside propeller blade between the openings adapted to deliver a portion of its discharge into the hollow through the rearward openings to be thrown out at right angles to the driving direction through the forward openings.

7. In a propeller or turbine for water, a hollow streamline body consisting of three parts, front part, intermediate part and rear part, the intermediate part including a propeller ring and inside and outside blades mounted thereon, the rear part being provided with a forwardly directed concave hollow adapted to receive discharge from the outside blades and the forward part having a rearwardly communicating hollow adapted to receive the medium from the rearward part and to deliver it through openings to the outside of the body in front of the outside blades.

8. A propeller for an aircraft having a hollow streamline body, turbine blades on an intermediate part thereof outside of the body, and other blades on the inside of the body constructed as spokes thereof.

9. In an aircraft, a hollow streamline body having a succession of segment rings at the forward end thereof, propeller blades ranged around the outside end of the body rearward of the rings and adapted to deliver part of its discharge into the interior of the body rearward of the blades for return through the opening between the rings to the receiving side of the propeller.

10. In a wind motor, a funnel member mounted to shift its direction with the wind, a three part streamline body spaced inwardly from the inside of the funnel having a forward part and rearward part rigidly connected to the funnel by blades arranged as spokes and an intermediate part mounted to rotate with respect to the front and rear parts which rotatably support the intermediate part, and blades mounted upon the intermediate part extending outwardly toward the interior of the funnel.

11. In a wind motor, a three part streamline body, a funnel member surrounding the body coaxially and rigidly supporting the front and rear parts of the body and itself adapted to shift with the wind, the intermediate part being rotatably mounted upon one or both of the other parts and carrying propeller blades inside the funnel, and rearward part being hollowed and open rearwardly of the blades to receive a portion of the discharge therefrom for return through the intermediate part and through the forward part for delivery to the receiving side of the blades.

12. In an aircraft, a propeller and a wind shield mounted upon the forward portion thereof rigidly fastened to the propeller shaft and adapted to rotate the shaft during gliding movement of the craft in order to keep the engine slowly moving.

13. In an aircraft, a propeller having oppositely extending blades pitched to direct the air forwardly near the hub and to direct the air rearwardly toward the outer ends of the blades.

14. In an aircraft, a propeller having oppositely extending blades pitched to direct the air forwardly near the hub and to direct the air rearwardly toward the outer ends of the blades, in combination with a hinge connection between the outer and inner portions of the blades adapting the outer portions of the blades to feather when pressed upon the forward side.

15. In an aircraft, a propeller shaft, a conical wind shield upon the forward end thereof, propeller blades on the shaft rearwardly of the shield and vanes on the shield to guide the air to the outer portion of the propeller blades.

AXEL HOLMSTROM.